W. ZITELLA.
VEGETABLE CUTTER.
APPLICATION FILED JAN. 12, 1920.
1,339,254.
Patented May 4, 1920.
2 SHEETS—SHEET 1.
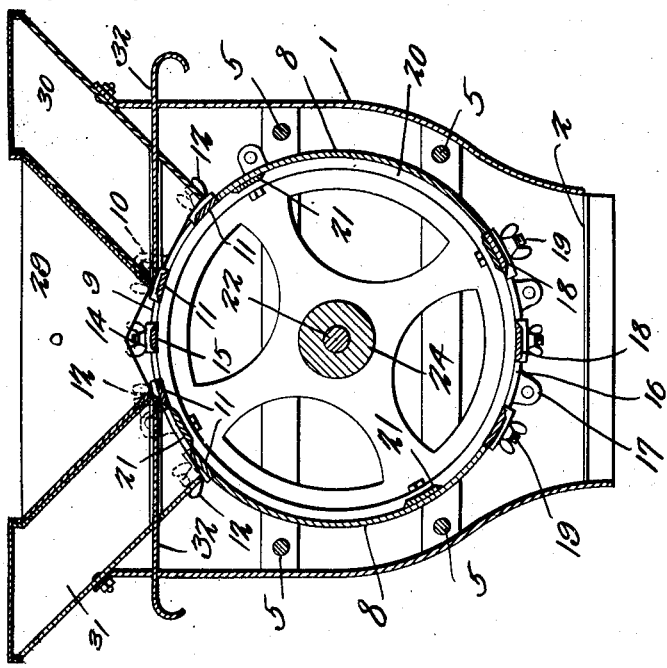
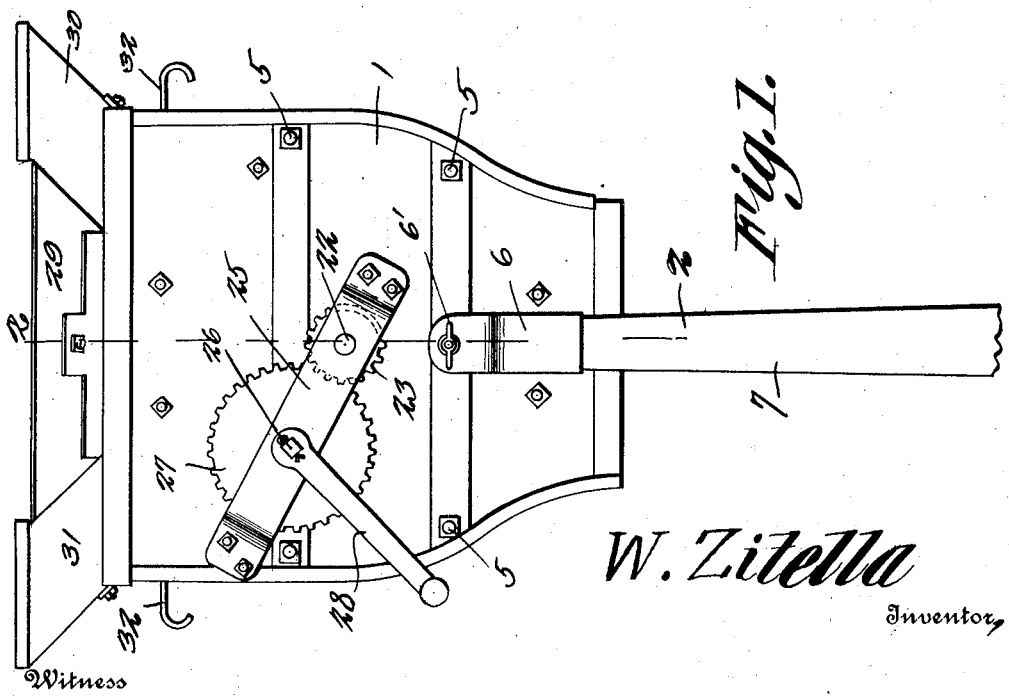

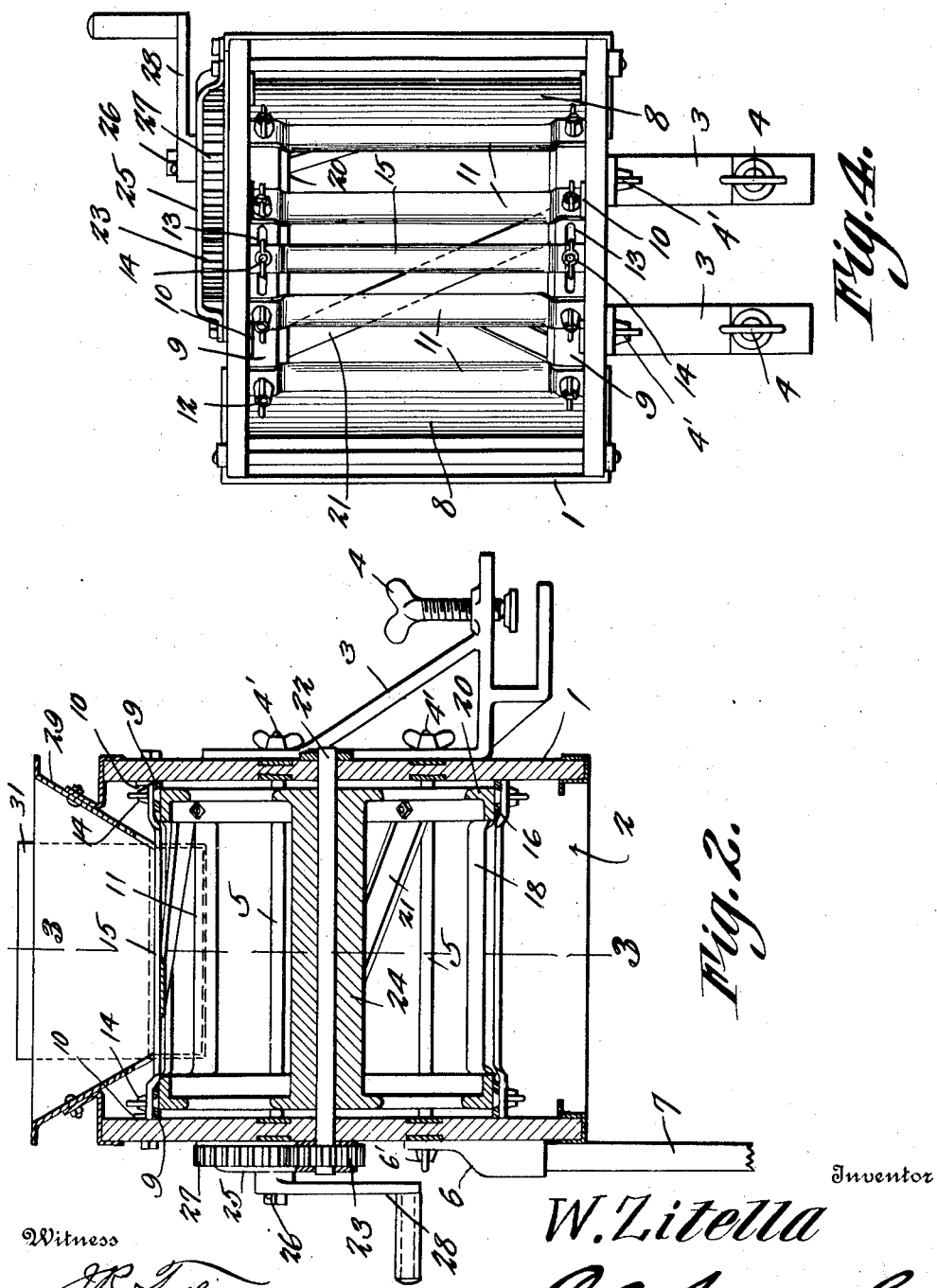

UNITED STATES PATENT OFFICE.

WILLIAM ZITELLA, OF ADAMSTON, WEST VIRGINIA.

VEGETABLE-CUTTER.

1,339,254.

Specification of Letters Patent.   Patented May 4, 1920.

Application filed January 12, 1920. Serial No. 350,744.

*To all whom it may concern:*

Be it known that I, WILLIAM ZITELLA, a citizen of the United States, residing at Adamston, in the county of Harrison and State of West Virginia, have invented a new and useful Vegetable-Cutter, of which the following is a specification.

This invention relates to vegetable cutters and is more particularly designed for reducing large quantities of vegetables to a finely comminuted condition, it being possible by means of said device to act simultaneously upon one or more different kinds of vegetables supplied to the machine through different inlets and in controllable quantities, the various vegetables, after being cut, being thoroughly mixed.

A further object is to provide a device of this character utilizing cutting blades which can be adjusted readily to vary the size of the particles produced and which blades can be easily sharpened.

Another object is to provide a device of this character which can be operated readily and will quickly reduce vegetables to a finely divided condition.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing the preferred form of the invention has been shown.

In said drawing—

Figure 1 is a front elevation of the device, the supporting leg being broken away.

Fig. 2 is a section on line 2—2, Fig. 1.

Fig. 3 is a section on line 3—3, Fig. 2.

Fig. 4 is a top plan view of the device with the feed devices removed.

Referring to the figures by characters of reference 1 designates a housing provided at its bottom with an outlet 2 and extending from one face of the housing are brackets 3 having clamping screws 4 and which brackets are adapted to be connected to the edge portion of a table top. These brackets are held in place by bolts 4'. Rods 5 extend through the casing 1 close to the opposed walls thereof and these rods serve to bind the parts of the casing together. Another bolt 6' is utilized for the purpose of attaching a socket member 6 to the casing and in this socket member is removably mounted a supporting leg 7. This leg is located at that side of the casing opposite to the side from which the brackets 3 extend and it will be apparent that the casing can thus be held firmly in position for use.

Secured within the casing 1 are opposed arcuate guide plates 8 spaced apart at their upper and lower ends and detachably mounted between the upper ends of these guide plates is a removable cutting element including arcuate strips 9 having outstanding ears 10 which are detachably fastened to opposed walls of the casing 1. These strips are connected by cutting blades 11 detachably secured to the strips by bolts 12 or the like, each blade having its two longitudinal edges sharpened. Longitudinal slots 13 are formed in the strips 9 at the centers thereof and receive securing bolts 14 which engage the ends of an intermediate cutting blade 15, the two longitudinal edges of this blade being sharpened. By providing the slots 13 the bolts 14 can be adjusted longitudinally therein so as to adjust the blade 15 angularly to any desired position relative to the adjoining blades 11.

The lower ends of the plates 8 are spaced apart and interposed therebetween are arcuate strips 16 having ears 17 detachably secured to the adjoining walls of the casing 1. These strips 16 are connected by cross blades 18 fastened to the strips by means of bolts 19 or the like and which blades have their opposed longitudinal edges sharpened as shown.

The plates 8 and the strips 9 and 16 define a cylindrical space in which a rotating cutting element is mounted. This element includes circular heads 20 connected at desired intervals by obliquely disposed blades 21 both longitudinal edges of which are sharpened. The heads are attached to a transverse shaft 22 journaled in opposed walls of the casing and one end of which is provided with a gear 23. As shown particularly in Fig. 2 the heads may be made integral by forming them at the ends of a spool 24.

A bracket 25 is removably mounted on one wall of the casing 1 and journaled in this bracket and in the casing is a short shaft 26 to which is secured a gear 27 meshing with the gear 23. A crank arm 28 may be attached to the shaft 26 and by means thereof the revoluble cutting element can be operated at a high speed so that its blades will travel along the inner surfaces of the blades 11, 15 and 18. Instead of operating the mechanism by hand the bracket 25 can be removed and a pulley or the like, not shown, can be connected directly to the shaft 22 in lieu of the gear 23.

Opening into the top of the casing is a central hopper 29 adapted to direct material downwardly onto the central blade 15 and the adjoining blade 11. Feed chutes 30 and 31 are located at opposite sides of the hopper 29 and are adapted to direct material against the blades 11. Each of these chutes 30 and 31 has a cut off slide 32.

In using the apparatus herein described a vegetable of one kind is placed in the hopper 29, a vegetable of another kind is placed in the chute 30 and a third kind of vegetable is placed in the chute 31. These various materials will feed by gravity onto the blades thereunder and when the rotary cutting element is set in motion the blades thereon will coöperate with the blades 11, 15 and 18 so as to reduce the material to a finely comminuted state, strips of the cut vegetables falling into the space between the plates 8 and then outwardly between the blades 18 where they are cut by the traveling blades 21 and further reduced in size. The cut material is delivered through the outlet 2 and will be found to be thoroughly mixed. By means of the cutoff 32 the proportions of the different vegetables can be controlled.

Importance is attached to the fact that the central blade 15 is adjustable angularly. Thus it is possible to vary the size of the particles cut at this point.

What is claimed is:—

1. The combination with a casing having an inlet and an outlet, opposed guide plates mounted in the casing and spaced apart therein, and cutting blades mounted between the ends of the plates, of a revoluble cutting element interposed between the plates and coöperating with said blades, and means for directing material onto the blades.

2. The combination with a casing having an inlet at the top thereof and an outlet at the bottom, and opposed guide plates within the casing and spaced apart at the inlet and outlet, of blades mounted between the ends of the plates, a member mounted for rotation between said plates, obliquely disposed blades carried thereby and coöperating with the first named blades, at the inlet and outlet portions of the casing successively, and means for directing material onto the blades at the inlet portion of the casing.

3. The combination with a casing having an inlet and an outlet, of opposed arcuate guide plates within the casing and spaced apart adjacent the inlet and outlet, stationary blades mounted between said plates at the inlet and outlet, means for securing one of the blades at the inlet, said blade being adjustable bodily and angularly relative to the adjoining blades, an element mounted for rotation between the guide plates, and cutting blades carried by said element and coöperating with the stationary blades at the inlet and outlet respectively.

4. The combination with a casing having an inlet and an outlet, and opposed arcuate guide plates within the casing spaced apart at their upper and lower ends, of separate feed devices for directing material to the space between the upper ends of the plates, stationary blades extending across said space, stationary blades interposed between the lower ends of the guide plates and adjacent the outlet, and a cutting element mounted for rotation between the plates and coöperating with the stationary blades at the inlet and outlet successively.

5. The combination with a casing having an inlet and an outlet and opposed arcuate guide plates within the casing spaced apart at their ends, of separate means for directing material to the space between the guide plates at the inlet end of the casing, blades extending across said space, means for adjustably fastening one of the blades, blades extending across the space between the plates at their other end, and a cutting element mounted for rotation between the guide plates and coöperating successively with the stationary blades at the inlet and outlet to reduce material to a finely comminuted state.

6. The combination with a casing, opposed arcuate guide members therein providing an inlet between one end and an outlet between their other end, of separate means for directing material to the inlet, means for controlling the discharge of material from said material directing means, cutting blades detachably mounted at the inlet, means for adjustably fastening one of said blades, cutting blades detachably mounted across the outlet, and obliquely disposed cutting blades mounted for rotation between the guide plates and coöperating successively with the stationary blades at the inlet and outlet to reduce material to a finely comminuted state.

In testimony that I claim the foregoing as my own I have hereto affixed my signature in the presence of two witnesses.

WILLIAM ZITELLA.

Witnesses:
MOORE M. REYNOLDS,
VIRGILIO ARENA.